(12) United States Patent
Talayco et al.

(10) Patent No.: US 8,214,851 B2
(45) Date of Patent: Jul. 3, 2012

(54) API INTERFACE TO MAKE DISPATCH TABLES TO MATCH API ROUTINES

(75) Inventors: Daniel Talayco, Mountain View, CA (US); Brian Baird, Pleasanton, CA (US)

(73) Assignee: Broadcom Corporation, Irvine, CA (US)

( * ) Notice: Subject to any disclaimer, the term of this patent is extended or adjusted under 35 U.S.C. 154(b) by 971 days.

(21) Appl. No.: 11/429,289

(22) Filed: May 8, 2006

(65) Prior Publication Data

US 2006/0253861 A1 Nov. 9, 2006

Related U.S. Application Data

(60) Provisional application No. 60/678,215, filed on May 6, 2005.

(51) Int. Cl.
*G06F 9/44* (2006.01)
*G06F 15/16* (2006.01)

(52) U.S. Cl. .................. 719/330; 709/242; 709/227

(58) Field of Classification Search .................. 717/149; 706/47

See application file for complete search history.

(56) References Cited

U.S. PATENT DOCUMENTS

| 6,598,034 | B1 * | 7/2003 | Kloth | 706/47 |
|---|---|---|---|---|
| 6,751,798 | B1 * | 6/2004 | Schofield | 719/330 |
| 2002/0124107 | A1 * | 9/2002 | Goodwin | 709/242 |
| 2004/0172626 | A1 * | 9/2004 | Jalan et al. | 717/149 |
| 2005/0225530 | A1 * | 10/2005 | Evans et al. | 345/156 |
| 2006/0248196 | A1 * | 11/2006 | Iszlai et al. | 709/227 |

* cited by examiner

*Primary Examiner* — Andy Ho
*Assistant Examiner* — Tuan Dao (57) ABSTRACT

A method, system and apparatus for constructing dispatch tables match application program interface service routines. The invention includes reading a header file of the application program interface. The invention further includes generating a corresponding dispatch table for at least one device indicated in the header file, wherein the corresponding dispatch tables are generated based on information read from the header file. The invention further includes verifying that the information contained in the dispatch tables is consistent with current requirements of the application program interface.

17 Claims, 5 Drawing Sheets

API INTERFACE TO MAKE DISPATCH TABLES TO MATCH API ROUTINES

CROSS-REFERENCE TO RELATED APPLICATIONS

This application claims priority of U.S. Provisional Patent Application No. 60/678,215, filed on May 6, 2005. The subject matter of this earlier filed application is hereby incorporated by reference.

BACKGROUND OF THE INVENTION

1. Field of the Invention

This contribution relates to an interface for an Application Program Interface (API).

2. Description of the Related Art

As computer performance has increased in recent years, the demands on computer networks has significantly increased; faster computers processors and higher memory capabilities need networks with high bandwidth capabilities to enable high speed transfer of significant amounts of data. The well known Ethernet technology, which is one example of computer networking technology which has been able to be modified and improved to remain a viable computing technology.

Based upon the Open System Interconnect (OSI) 7-layer reference model, network capabilities have grown through the development of repeaters, bridges, routers and switches, which operate with various types of communication media. Collectively, with respect to the present invention, all of these may be referred to as network devices. Switches, as they relate to computer networking and to Ethernet, are hardware-based devices which control the flow of datagrams, data packets or cells based upon destination address information which is available in each packet. A properly designed and implemented switch should be capable of receiving a packet and switching the packet to an appropriate output port at the maximum speed capability of the particular network.

Referring to the OSI 7-layer reference model discussed previously, the higher layers typically have more information. Various types of products are available for performing switching-related functions at various levels of the OSI model. Hubs or repeaters operate at layer 1, and essentially copy and "broadcast" incoming data to a plurality of spokes of the hub. Layer 2 switching-related devices are typically referred to as multiport bridges, and are capable of bridging two separate networks. Bridges can create a table of forwarding rules based upon which media access controller (MAC) address exist on which ports of the bridge, and pass packets that are destined for an address which is located on an opposite side of the bridge. Bridges typically utilize what is known as the "spanning tree" algorithm to eliminate potential data loops; a data loop is a situation wherein a packet endlessly loops in a network looking for a particular address. The spanning tree algorithm defines a protocol for preventing data loops. Layer 3 switches, sometimes referred to as routers, can forward packets based upon the destination network address. Layer 3 switches are capable of learning addresses and maintaining tables thereof which correspond to port mappings. Processing speed for layer 3 switches can be improved by utilizing specialized high performance hardware, and off loading the host CPU so that instruction decisions do not delay packet forwarding.

In addition, there has also been pressure from the implementers of the computer networks to have network devices to mediate traffic on the computer networks that are flexible and are able to provide the needed capacity through the combination of multiple network devices. For example, a network device having eight ports may be linked with one or more similar network devices to provide the capacity of the multiple ports of the linked devices. While the combination of multiple network devices may be ideal in meeting capacity requirements, the combination of the network devices also results in other issues. One such issue is that each network device has its own means for determining the destination port for a received datagram and those means must be synchronized to provide efficient operation. While the prior art network devices and methods provide many of these attributes, there is a need for network devices that may be used together to provide the capacity needed by the implementers and provide efficiency in handling of datagrams.

Today's network switching products often require high port density, centralized management, redundancy, modularity and many other features. Providing these features requires flexible, distributed approaches coordinating multiple CPUs, which support components that may be added or removed dynamically.

There are different methods in the art to provide upgrades among different product lines and to provide multi-product support for these products. The problems associated with providing upgrades and related support is that each of the products or different versions of the products require different arguments.

For example, to create a VLAN that includes all 24 Gigabit ports, each device must be programmed to create the VLAN, add all 12 GE ports to the VLAN, as well as add the links to the VLAN. An appropriate API is needed in order to enable rapid and accurate development on configurations with multiple devices.

There are different methods in the art to provide upgrades among different product lines and to provide multi-product support for these products. The problems associated with providing upgrades and related support is that each of the products or different versions of the products require different arguments.

DETAILED DESCRIPTION OF THE PREFERRED EMBODIMENT(S)

Stackable and chassis-based software products reflect two approaches to address the requirements discussed above. Building these systems involves solving many complex issues.

Stacking is a method of connecting two or more physical switch devices to build a larger system that behaves as a single logical entity. For example, for some devices, this means connecting devices together using Gigabit ports configured in a stacked mode. In other examples, stacking is accomplished over various links such as a Gigabit link.

In this example, the hardware attaches information to each packet traversing a stack link. This allows the switch device functions to work properly across multiple devices. For example, link aggregation requires that information be passed with the packet to provide load balancing across the trunked ports. The goal of stacking is to eliminate the need for applications to be aware of these details.

Figure 1:
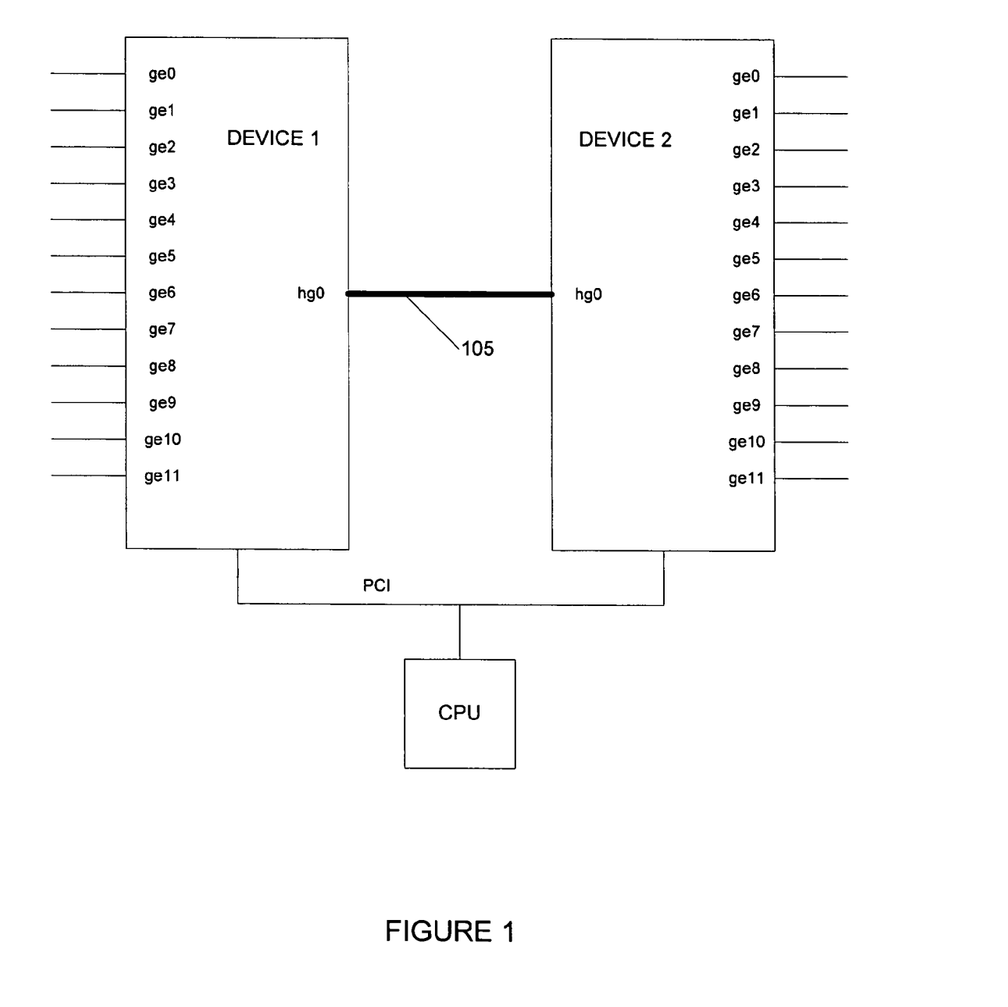
FIG. 1 illustrates an example of a device configuration.

When multiple devices exist in a system, tasks such as creating a virtual local area network (VLAN) may require the programming of all of these multiple devices. FIG. 1 illustrates an example of a multiple device configuration. In this example, the two devices Device 1 and Device 2 are connected by a link 105 such as a PCI bus. In this example, only one CPU is used to manage this configuration. Also, for discussion only, these devices are illustrated as having 12 gigabit ports ge0-ge11. The use of an API to control these devices is relatively straight forward, as the two devices Device 1 and Device 2 are recognized on the PCI bus 105 and programmed directly by the CPU. In such a configuration, there are programming requirements to ensure that the two devices act as one. Device include, but are not limited to, switches, routers and bridges and the like.

For example, to create a virtual local area network (VLAN) that includes all 24 Gigabit ports, each device must be programmed to create the VLAN, add all 12 GE ports to the VLAN, as well as add the links to the VLAN. An appropriate API is needed in order to enable rapid and accurate development on configurations with multiple devices.

A more complex form of stacking involves multiple CPUs where multiple independent switches that are connected together act as one logical switch. For example, a 48-port switch with its own CPU subsystem and local configuration may be connected to another such unit.

Figure 2:
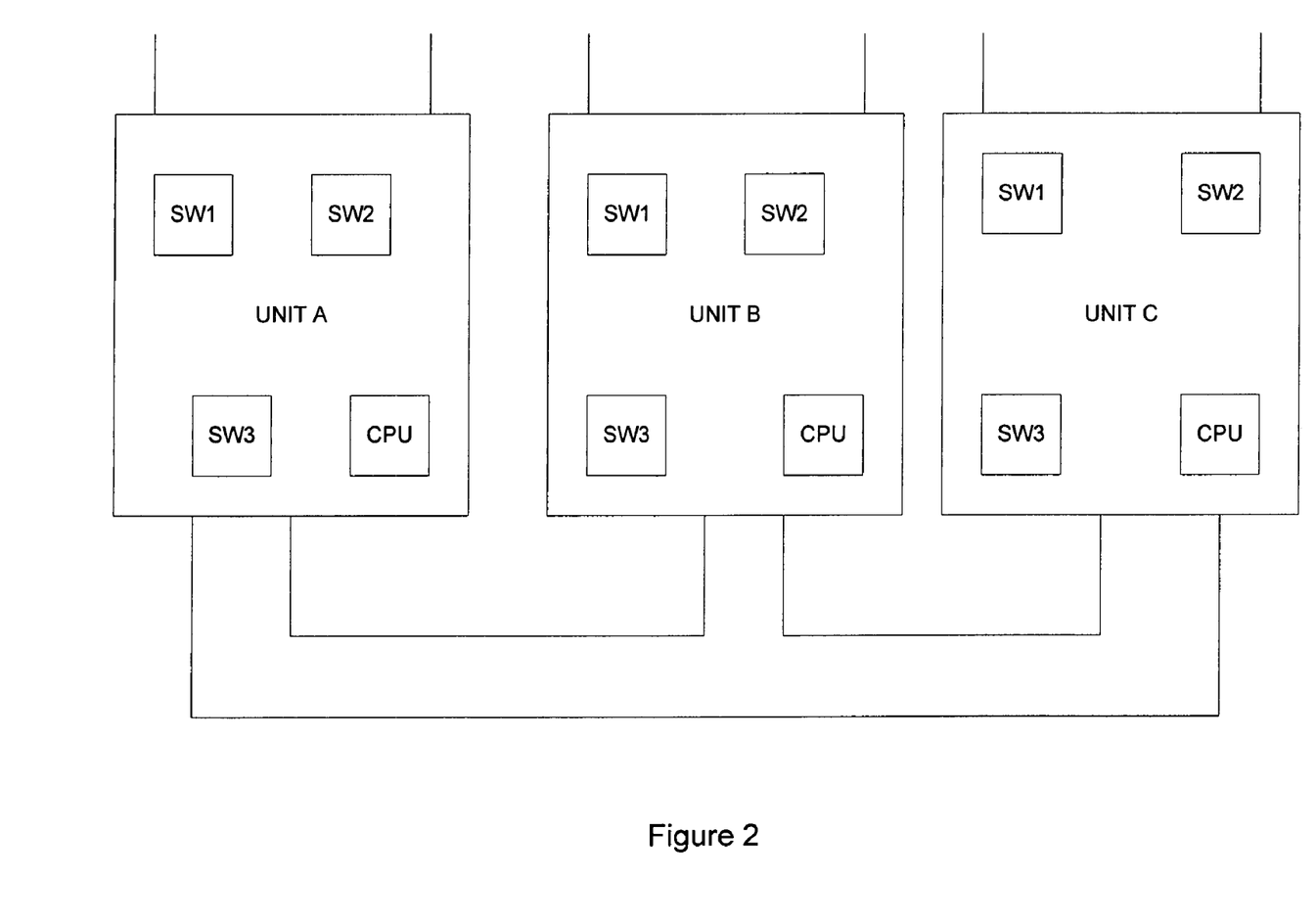
FIG. 2 represents an exemplary configuration of a communications system of stacked network devices.

FIG. 2 represents an exemplary configuration of a communications system of stacked network devices. In FIG. 2, three units Unit A, Unit B and Unit C are stacked, or connected together to provide the scalability discussed above. The network devices send and/or receive data across dedicated connections referred to as "stack ports." Note that each unit may include multiple switch devices SW1, SW2 and SW3. According to this configuration, each device within the unit is controlled by a CPU that programs the local circuitry, as well as, coordinates with CPUs in other units. The stacked network devices perform as a single logical network switch with a larger load capacity. Network devices may be network hardware components capable of generating, receiving and processing packets. The network devices may have switching and/or routing capabilities that are utilized in a local area network (LAN) or other communications networks or systems. As shown in the example illustrated in FIG. 2, each of the network devices may include a processor (CPU) or CPU functionality, be in communication with a CPU or connected to an external CPU.

In order to provide product upgrades, different means are used to affect, upgrade and/or control, all of the different devices and/or device types. The means used for upgrading and/or controlling these device include, but are not limited to, software code, hardware, firmware, or semiconductor devices. For example, in order to create a VLAN (bcm_vlan_create) there will have to be specific arguments for each device because different switch devices such as chips, create VLANs in different ways, depending upon the different configuration. For example referring again to FIG. 2, in Unit A, SW1 may be a different product than SW2 or SW3. Thus, the command for creating a VLAN may be for example; vlan_create (int unit,_vlan_+vlan), for each device and for each type of device.

In addition, different customers may want to be able to receive the instructions, but do not want to have to compile all of the code that relates to other products. Thus a separate set of code is necessary that only addresses the devices of a particular client. The above results in an excessive amount of code that has to written by a software developer. In addition, there is excessive use of manpower and computing resources that are needed in order to complete the above described tasks.

In order to reduce the amount of code that has to be written and the amount of computing resources that are used, developers create dispatch tables in order to facilitate multi-product support. This method is described using the instruction to create a VLAN that is discussed above.

In this example, an instruction to create a VLAN for a plurality of switches is;

sw1_vlan_create (unit_t, vlan)
sw2_vlan_create (unit_t, vlan)
.
.
.
swi_vlan_create (unit_t, vlan)

The instruction call table [unit]_vlan_create provides a pointer to a dispatch table entry. The dispatch table, contains the arguments that are specific to a particular product. Thus, in comparison to the method discussed above, the code written to create a VLAN among the different products does not have to include arguments for each different device. In addition, for the customers who require more compiling efficiency, separate routines do not have to be created to accommodate them.

However, there are disadvantages to the method discussed above. One disadvantage is that the dispatch tables have to be manually created. Another disadvantage is that in the event of a product upgrade, the dispatch tables have to be manually updated. While this method is more efficient to implement than the method discussed above, the method still requires a significant amount of resources to implement.

The method disclosed below is a more efficient and accurate utilization of resources and support features. An interface for an application program interface (API interface) is described below. According to an exemplary embodiment of the invention, the method dynamically creates dispatch tables to match Application Program Interface (API) routines.

Figure 3:
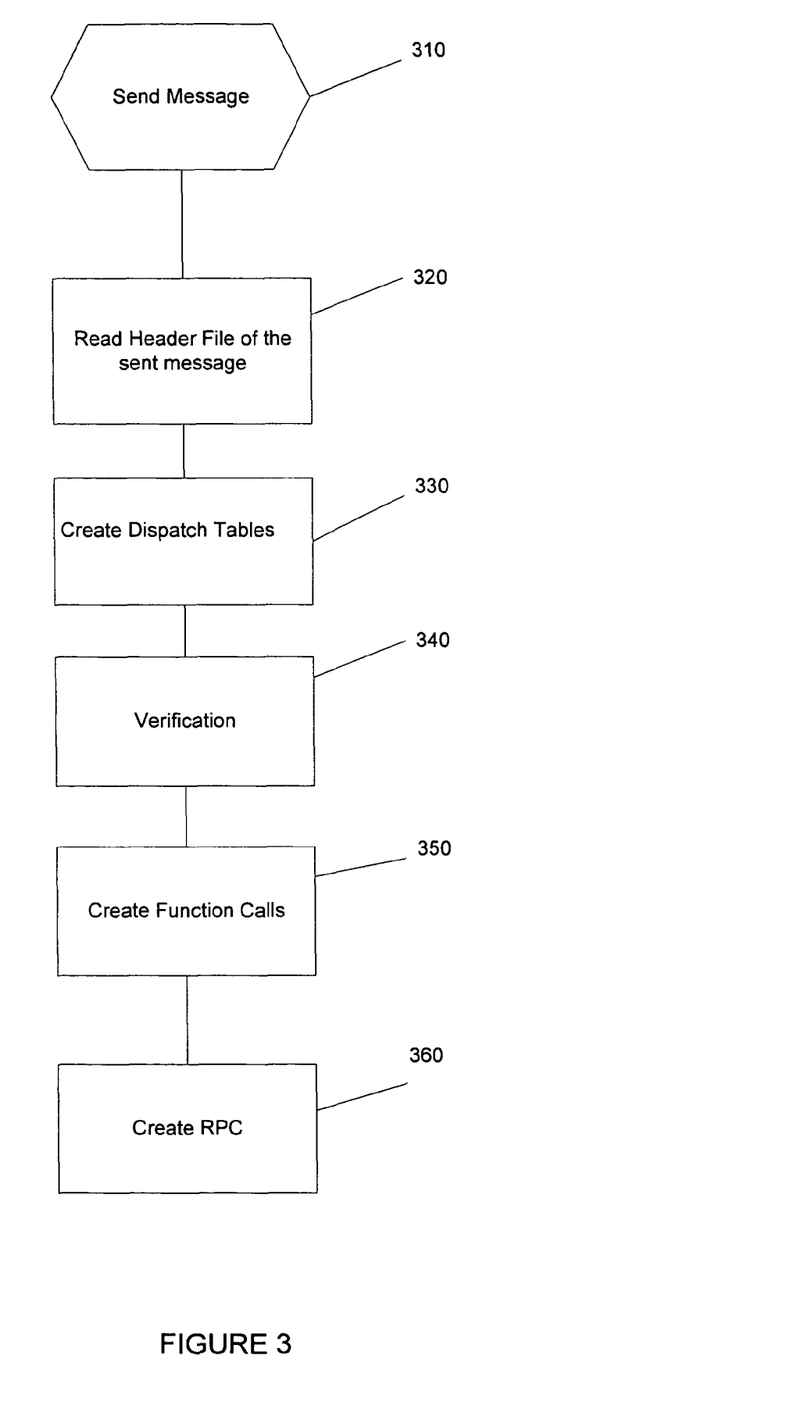
FIG. 3 is a flow diagram according to an exemplary embodiment of the invention.

FIG. 3 is a flow diagram according to an exemplary embodiment of the invention. At 310 the method begins by sending a message for a function call such as vlan_create. At 320 the header file of the API message is read. The header file performs some of the functions associated with a configuration file. The header file includes the commands, flags and definitions of the API. The header file is created manually or can be created automatically. This information taken out of the header file is used to generate definitions for different commands used by the various products and creates and fills in dispatch tables with appropriate information. For example, each entry in the dispatch table is defined in the header file when the vlan_create command is sent.

The definitions may also contain variant versions of the APIs or versions of the APIs that can be used at a later time. Further, the header file may include functions that are implemented immediately as well as functions that will be implemented at a later time.

Next, corresponding dispatch tables for the devices are generated 330. The dispatch tables are constructed based upon the command to construct the dispatch tables contained in the API header file. Thus, based on the information in the header file, the vlan_create API will generate dispatch tables for each switch device defined in the header file. Each entry in the dispatch table contains a pointer to a corresponding service routine.

Once the command is read from the header file to generate a dispatch table for a specific device, a database is consulted. The database contains information for generating the dispatch tables, and specifies the number of rows and columns of the dispatch table being generated. In another exemplary embodiment, the number of rows or columns of the dispatch tables that are to be generated is computed. The database also contains information for filling the entries in the dispatch tables for the specified device.

Figure 4:
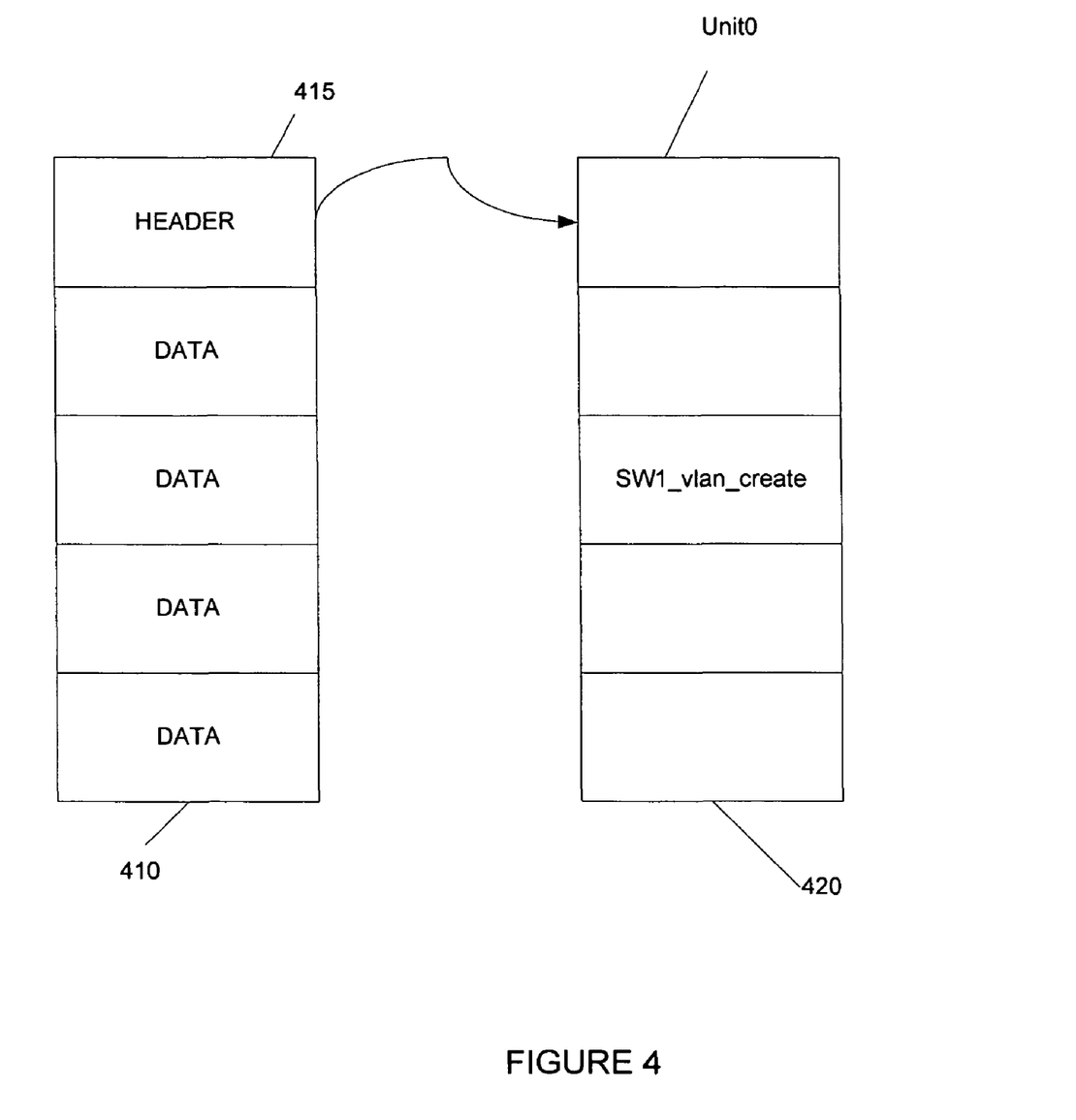
FIG. 4 is an example illustration of the dispatch table created for different switch devices.

FIG. 4 is an example illustration of the dispatch table created for different switch devices. The example switch device is identified as Unit0. Within each dispatch table, as discussed above, is a pointer for a API such as vlan_create. The data packet 410 includes header 415. As discussed above, the information includes in the header 415 is used to create the dispatch table 420. The contents of the dispatch table 420 includes pointers to different functions.

Referring again to FIG. 3, next, the method verifies the success or failure of the routines 340. The verification is performed at the time of compilation and involves a mechanism to ensure that the definitions are consistent with current requirements for the different devices. The verification includes type matching. Type matching is performed at the time of compilation.

Verification and type matching ensures that the functionality offered by the API matches the functionality requested in a remote procedure call, and ensures that the API requested, matches the API offered by the system. The verification may include for example, a manipulation and/or re-arrangement of parameters.

The method of the present invention also creates multi-chip support for stacked configurations.

Next, at 350 multi-chip function calls are created from the information contained in the header file. The function calls include functions that are to be immediately implemented by the stacked system and functions that will be implemented at a later time or asynchronous functions.

Asynchronous APIs are functions that take place at a later time and do not receive data or a response immediately after sending the message. Asynchronous APIs periodically poll network devices or use interrupts, in order to determine their status. If the status of the device being polled is changed, such as a link to the device being created or destroyed, the device sends a call-back, or an indication of the change of status. This change of status is referred to as an asynchronous event.

Asynchronous events include, but are not limited to for example, reconfiguration events, link changes, discovery packet arrivals, functions that learn new addresses and destroys old addresses etc.

Next, the remote procedure calls (RPC) for the devices are generated 360. The RPC is needed for devices that are attached to remote processors (CPUs). The devices that are attached to remote CPUs contain RPC drivers. Thus, a remote device, such as a switch chip, looks like a local device to applications using the API. In general, a RPC is a protocol that one program can use to request a service from a program located in another computer in a network without having to understand the network details. Typically, a RPC uses the client/server model. The requesting program is a client and the service-providing program is the server. Like a regular or local procedure call, an RPC is a synchronous operation requiring the requesting program to be suspended until the results of the remote procedure are returned.

When program statements that use RPC are compiled into an executable program, a stub is included in the compiled code that acts as the representative of the remote procedure code. When the program is run and the procedure call is issued, the stub receives the request and forwards it to a client runtime program in the local computer. The client runtime program has the knowledge of how to address the remote device and sends the message across the network that requests the remote API. Similarly, the server includes a runtime program and stub that interface with the remote procedure itself. Results are returned the same way.

As a result of the exemplary process described above, dispatch tables for the different units and device in a stacked system are created. The created dispatch tables match the API routines for the stacked system and allows for efficient system support and development.

Figure 5:
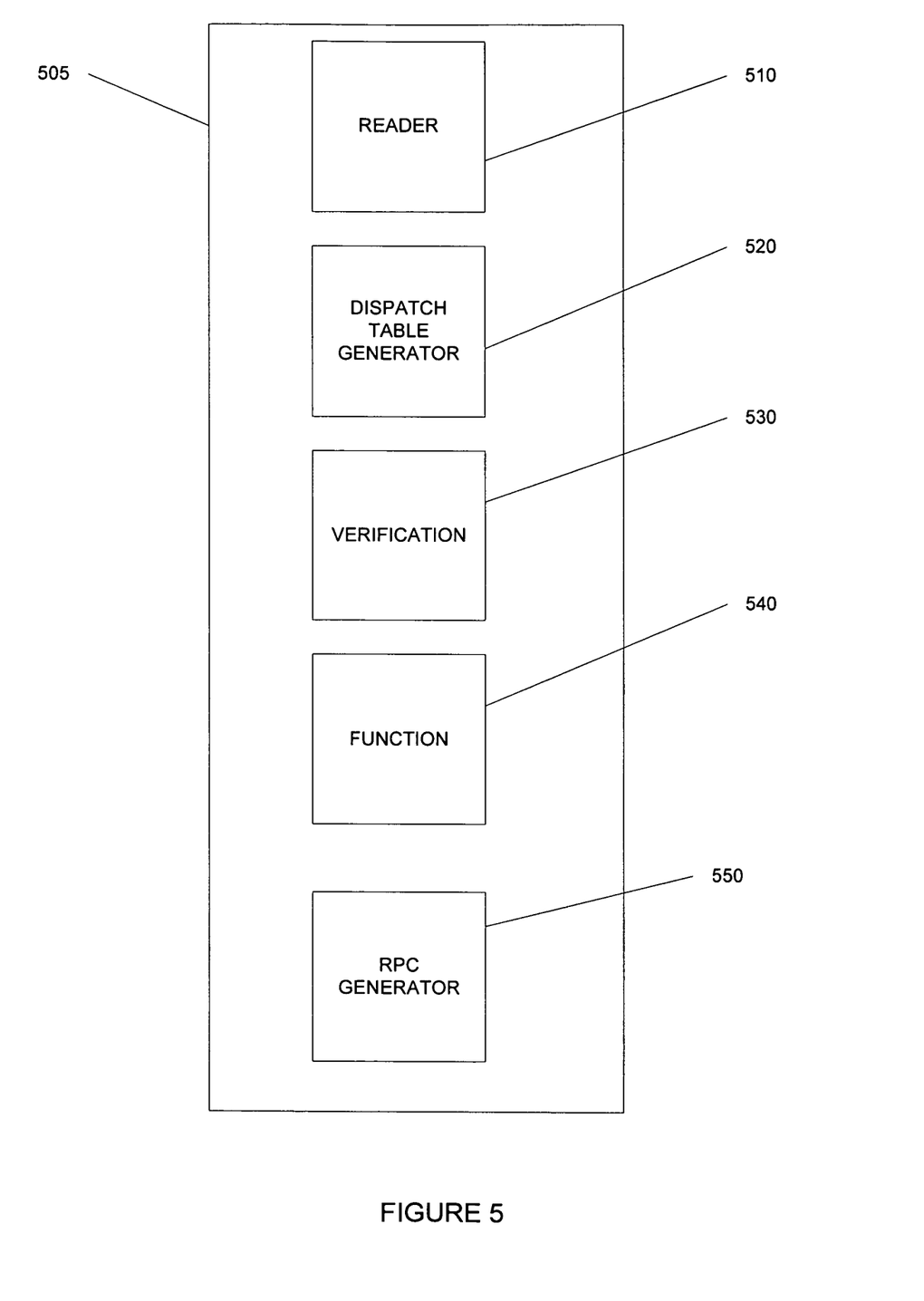
FIG. 5 illustrates an exemplary system 505 for creating dispatch table for APIs.

FIG. 5 illustrates an exemplary system 505 for creating dispatch table for APIs. 510 is a reader module that reads the header file of the application program interface. As discussed above the header file is created either manually or automatically. The header file includes the commands, flags and definitions of the API. The header file is created manually or can be created automatically. This information taken out of the header file is used to generate definitions for different commands used by the various products and creates and fills in dispatch tables with appropriate information.

The dispatch table generating system 505 further includes a dispatch table generator 520. The dispatch tables generated by the dispatch table generator 520 are constructed based upon the command to construct the dispatch tables contained in the API header file. Thus, based on the information in the header file, the vlan_create API will generate dispatch tables for each switch device defined in the header file. Each entry in the dispatch table contains a pointer to a corresponding service routine.

Once the command is read from the header file to generate a dispatch table for a specific device, a database is consulted. The database contains information for generating the dispatch tables, and specifies the number of rows and columns of the dispatch table being generated. In another exemplary embodiment, the number of rows or columns of the dispatch tables that are to be generated is computed. The database also contains information for filling the entries in the dispatch tables for the specified device.

The system 505 further includes a verification module 530 that verifies that the information contained in the dispatch tables is consistent with current requirements and verifies the success or failure of the routines. The verification is performed at the time of compilation and involves a mechanism to ensure that the definitions are consistent with current requirements for the different devices. The verification includes type matching. Type matching is performed at the time of compilation.

Verification and type matching ensures that the functionality offered by the API matches the functionality requested in a remote procedure call, and ensures that the API requested, matches the API offered by the system. The verification may include for example, a manipulation and/or re-arrangement of parameters.

The system 505 further includes a function module 540. The function module 540 generates a plurality of function calls for each of the dispatch tables created by the dispatch table generator.

The function calls include functions that are to be immediately implemented by the stacked system and functions that will be implemented at a later time or asynchronous functions.

Asynchronous APIs are functions that take place at a later time and do not receive data or a response immediately after sending the message. Asynchronous APIs periodically poll network devices or use interrupts, in order to determine their status. If the status of the device being polled is changed, such as a link to the device being created or destroyed, the device sends a call-back, or an indication of the change of status. This change of status is referred to as an asynchronous event.

Asynchronous events include, but are not limited to for example, reconfiguration events, link changes, discovery packet arrivals, functions that learn new addresses and destroys old addresses etc.

The system 505 further includes a RPC module that generates a plurality of remote procedure calls for each of the dispatch tables created by the dispatch table generator 550. The RPC is needed for devices that are attached to remote processors (CPUs). The devices that are attached to remote CPUs contain RPC drivers. Thus, a remote device, such as a switch chip, looks like a local device to applications using the API. In general, a RPC is a protocol that one program can use to request a service from a program located in another computer in a network without having to understand the network details.

One having ordinary skill in the art will readily understand that the invention as discussed above may be practiced with steps in a different order, and/or with hardware elements in configurations which are different than those which are disclosed. For example, the present invention may be implemented at least as a computer product including computer-readable code, a chip set or ASIC, or a processor configured to implement the method or system. Therefore, although the invention has been described based upon these preferred embodiments, it would be apparent to those of skill in the art that certain modifications, variations, and alternative constructions would be apparent, while remaining within the spirit and scope of the invention.

The invention claimed is:

1. A computer-implemented method for constructing dispatch tables to match application program interface service routines, the method comprising:
   reading, via a computer, an application program interface (API) header file, wherein the API header file identifies at least one programmable device and defines an entry in a corresponding dispatch table;
   generating, via the computer, the corresponding dispatch table for creating a virtual local area network (VLAN) for the at least one programmable device identified in the API header file, wherein:
     the corresponding dispatch table is generated based on information read from the API header file, and
     the entry defined by the API header file includes one or more arguments needed to program the at least one programmable device, wherein the one or more arguments are used to create the VLAN based on a type of the at least one programmable device; and
   verifying, via the computer, that the one or more arguments included in the dispatch table are consistent with current arguments required to program the at least one programmable device.

2. The computer-implemented method of claim 1, further comprising generating a dispatch table entry for a remote procedure call (RPC).

3. The computer-implemented method of claim 2, further comprising generating a dispatch table entry for a function call, wherein the function call is generated from the information contained in the header file.

4. The computer-implemented method of claim 3, wherein the function call is an asynchronous function call.

5. The computer-implemented method of claim 1, wherein the API header file includes a function call.

6. The computer-implemented method of claim 1, wherein the API header file includes a function call to be implemented immediately by the computer.

7. The computer-implemented method of claim 1, wherein the API header file includes a function call for the computer to implement at a later time.

8. The computer-implemented method of claim 1, wherein the API header file includes information used to generate definitions for commands.

9. The computer-implemented method of claim 1, further comprising:
   consulting, via the computer, a database for a number of rows and columns of the dispatch table, wherein the generating the corresponding dispatch table includes generating the dispatch table with the number of rows and columns based on the database.

10. A system for generating dispatch tables for an application program interface, the system comprising a processor configured to execute instructions stored on a computer readable storage medium to thereby operate as:
    a reader module that reads an application program interface (API) header file, wherein the API header file identifies at least one programmable device and defines an entry in a corresponding dispatch table;
    a dispatch table generator that generates the corresponding dispatch table for creating a virtual local area network (VLAN) with the at least one programmable device identified in the API header file, wherein:
      the dispatch table is created based on information read from the API header file by the reader module, and
      the entry defined by the API header file includes one or more arguments used to program the at least one programmable device, wherein the one or more arguments are used to create the VLAN based on a type of the at least one programmable device; and
    a verification module that verifies that the one or more arguments included in the dispatch table are consistent with current arguments required to program the at least one programmable device.

11. The system of claim 10, further comprising a module that generates a plurality of remote procedure call entries for each of the dispatch tables created by the dispatch table generator.

12. The system of claim 11, further comprising a function module that generates a plurality of function call entries for each of the dispatch tables created by the dispatch table generator, wherein the function call entries are generated from the information contained in the header file.

13. The system of claim 12, wherein the function call entries include asynchronous function call entries.

14. A computer program product, implemented on a computer readable storage medium, comprising instructions operable to cause a programmable processor to:
    read an application program interface (API) header file, wherein the API header file identifies at least one programmable device and defines an entry in a corresponding dispatch table;
    generate the corresponding dispatch table for creating a virtual local area network (VLAN) with the at least one programmable device identified in the API header file, wherein:
      the corresponding dispatch table is based on information read from the API header file, and the entry defined by the API header file includes one or more arguments used to program the at least one programmable device, wherein the one or more arguments are used to create the VLAN based on a type of the programmable device; and verify that the one or more arguments included in the dispatch table are consistent with current arguments required to program the at least one programmable device.

15. The computer program product of claim 14, further comprising instructions operable to cause a programmable processor to generate a remote procedure call (RPC) entry for the dispatch table.

16. The computer program product of claim 14, further comprising instructions operable to cause a programmable processor to generate function call entries for the dispatch table, wherein the function call entries are generated from information contained in the header file.

17. The computer program product of claim 16, wherein the function call entries include asynchronous function call entries.

* * * * *